July 18, 1944.　　　　F. W. BUTLER　　　　2,354,103
CAN TRANSFER APPARATUS AND METHOD
Filed May 10, 1941　　　　6 Sheets-Sheet 1

FIG_1_

INVENTOR
Frederick W. Butler
BY Boyken & Mohler
ATTORNEYS

July 18, 1944.  F. W. BUTLER  2,354,103
CAN TRANSFER APPARATUS AND METHOD
Filed May 10, 1941  6 Sheets-Sheet 3

FIG. 3

INVENTOR
Frederick W. Butler
BY Boyken & Mohler
ATTORNEYS

July 18, 1944.  F. W. BUTLER  2,354,103
CAN TRANSFER APPARATUS AND METHOD
Filed May 10, 1941  6 Sheets-Sheet 4

INVENTOR
Frederick W. Butler,
BY
Boyken & Mohler
ATTORNEYS

Patented July 18, 1944

2,354,103

UNITED STATES PATENT OFFICE 2,354,103

CAN TRANSFER APPARATUS AND METHOD

Frederick W. Butler, Oakland, Calif., assignor to Alaska Packers Association, San Francisco, Calif., a corporation of California Application May 10, 1941, Serial No. 392,880

12 Claims. (Cl. 198—29)

This invention relates to can transfer apparatus, and method of transferring cans from one station to another.

One of the objects of this invention is an improved method of transferring a plurality of tiers of cans in superposed relation at one station to another station in a single tier or layer in which the originally superposed tiers are disposed in such single tier or layer.

Another object is improved apparatus for carrying out the steps of the above mentioned method.

Another object is a can transfer apparatus for more quickly and easily arranging a double tier of cans in a single layer for subsequent handling of the cans, than has heretofore been possible.

A still further object is a single, rugged, and economically manufactured can transfer apparatus adapted to automatically arrange a plurality of superposed tiers of cans, as dumped from an inverted, standard-packed case, into a single layer, for subsequent labeling, or other manipulation of the individual cans by standard methods or standard apparatus.

An additional object is can transfer apparatus adapted to arrange a plurality of superposed tiers of cans, as dumped from an inverted, standard packed case, into a single layer for subsequent labeling or other treatment, whether the cans are filled or empty, and which apparatus is adapted to so arrange said cans appreciably faster than can be done manually by expert operators.

Other objects and advantages will appear in the specification and drawings.

Figure 1:
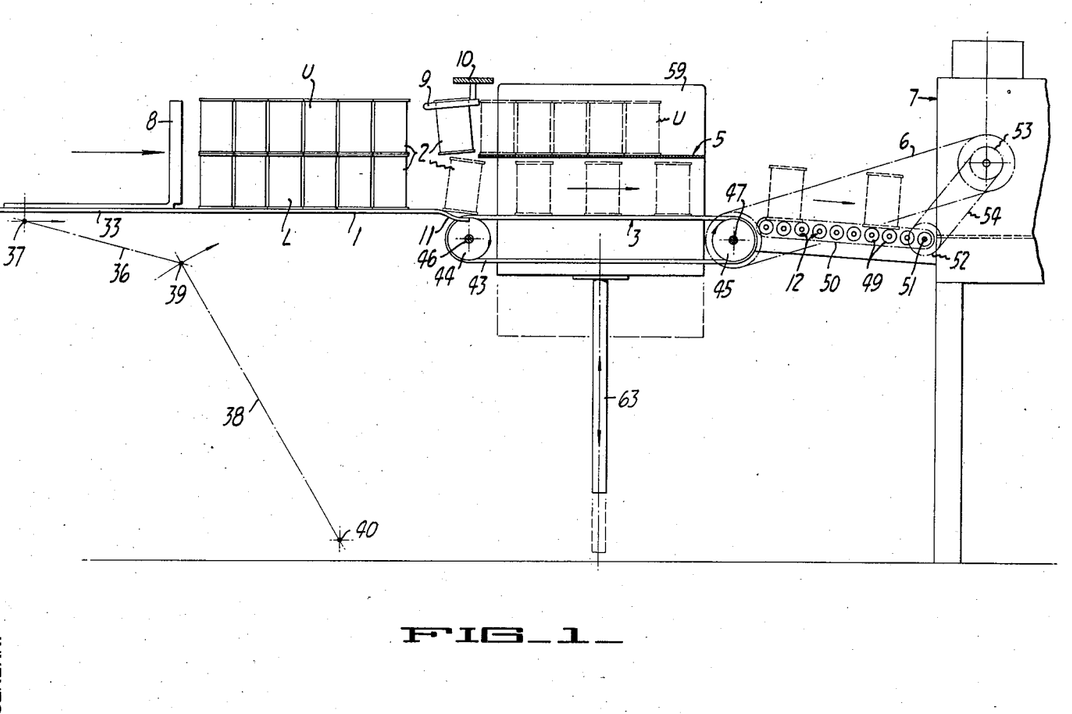
Fig. 1 is a side elevational, diagrammatic view of my invention illustrating the method as well as the general mechanical arrangement of the apparatus.

This invention, in its broadest aspect is best illustrated in Fig. 1. A horizontally disposed loading table 1 is provided, which table is adapted to support a plurality of tiers of cans 2 as such cans are dumped thereon from an inverted, standard-sized case.

At one end of table 1 is a horizontally extending conveyor 3, of the endless belt type, with its upper run disposed at a level slightly below the upper surface of table 1, while spaced above conveyor 3 is a horizontally disposed platform 5. The conveyor 3 is actuated by any suitable means, such as a belt 6 connecting between the said conveyor and a source of power, or to a power actuated pulley on a conventional can labeling machine 7, or other can handling machine adapted to perform some operation on the cans.

Behind cans 2 on table 1, at the end of said table opposite the conveyor, is a horizontally reciprocable pusher member 8 connected with a suitable pusher actuating means for reciprocation thereof. This pusher member is adapted to engage one end of the double-tier of cans 2 to push all of said cans toward the conveyor 3 and platform 5 and onto said conveyor and platform.

Pairs of spaced, slightly upwardly inclined, spring fingers 9 are secured in a horizontally extending row to a horizontal frame member 10, in a position to engage the cans of the upper tier U of the pile of cans on table 1, below the annular beads at the upper ends of said cans, and as the upper tier U, and lower tier L of said cans are pushed on table 1 toward the conveyor 3 and platform 5, the cans of said tier L successively drop downwardly over inclined ledge 11 that is between the table and conveyor 3, and onto said conveyor, while the cans of the upper tier U will move successively between the adjacent fingers 9 of each pair and onto the platform 5. As the cans of the lower tier U are successively moved onto the upper run of conveyor 3 they are rapidly carried by said conveyor to the end thereof opposite the table 1, where they pass onto a bed of power actuated rollers 12 and are carried away from the conveyor to the can labeling or other suitable can handling machine 7. These cans that pass onto conveyor 3 are so rapidly carried to the rollers 12 that by the time the upper tier U is on platform 5, practically all of the cans of the lower tier L have been carried from below said platform and upper tier to the rollers 12, except the last cans of the lower tier that are against pusher 8, and only a second or two elapses before these last cans are carried to said rollers, thus leaving the space clear below the platform 5 and the upper tier of cans U.

The platform 5 is vertically reciprocable, and as soon as the space below it is free from cans of the lower tier, said platform is lowered to the bottom end of its stroke, and is constructed so that the cans of upper tier U will be deposited on conveyor 3 when the platform is so lowered. The conveyor 3 then immediately carries the cans of said upper tier to rollers 12 where they follow the previously moved cans of the lower tier L. Thus the cans of the upper tier and lower tier will be delivered to rollers 12 or to the can labeling or handling machine 7, in a single layer in upright position.

It is to be noted that the fingers 9 will hold the last row of cans of the upper tier U, suspended therebetween, until a subsequent batch of cans is moved by pusher member 8 to conveyor 3 and platform 5, and at the end of the day, or whenever desired, the operator may manually remove these cans and deliver them to the desired point.

The above generally describes the operation of the machine, the function of which may be briefly stated to be the transfer of a plurality of tiers of cans from one station (table 1) to a second station (rollers 12 or apparatus 7) for arrival at said second station in a single tier or single layer.

Referring to Figs. 2 to 5, the transfer apparatus is shown more in detail.

Figure 3:
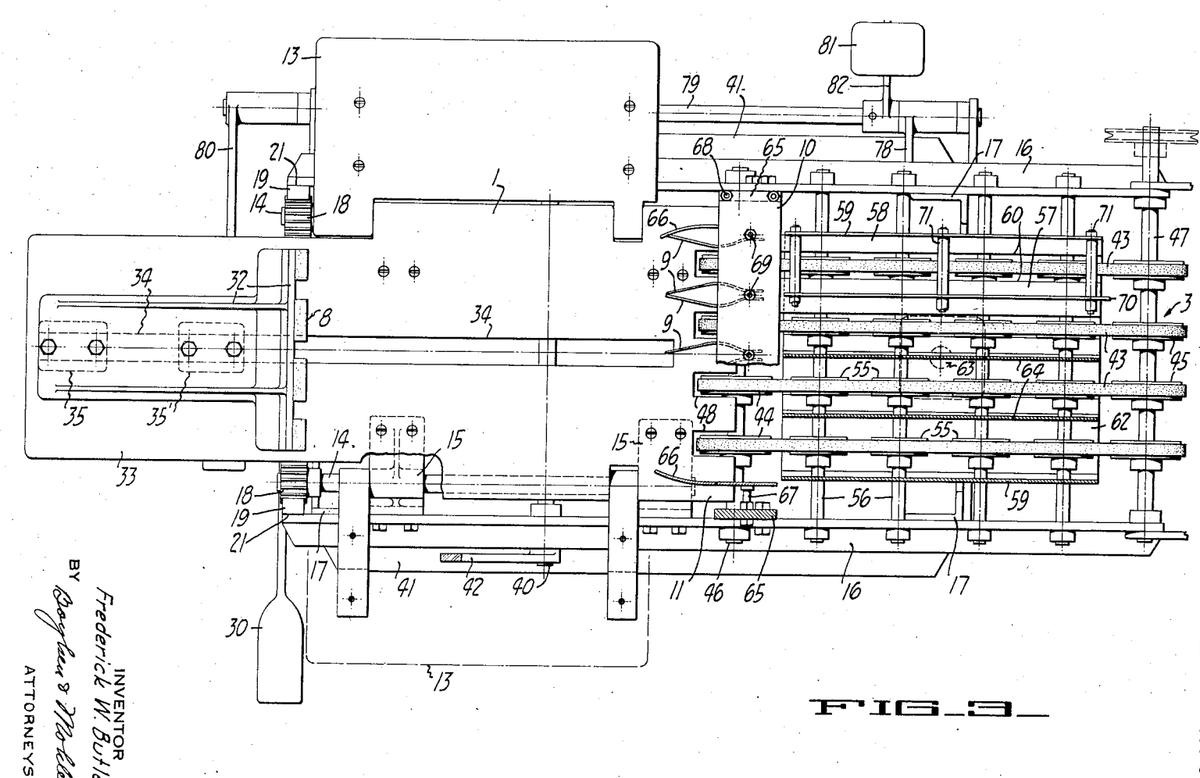
Fig. 3 is a plan view of the apparatus of Fig. 2 partly broken away at one end and partly in section.

The table 1 is provided with a pair of side leaves or wings 13 at two of its opposite edges that extend at right angles to the edge adjacent the conveyor (Fig. 3). These wings function as positioning means for positioning the tiers of cans on table 1 so that said cans will be sure to properly pass to the conveyor and platform 5 when pushed by the pusher member. The leaves are secured adjacent their edges nearest table 1 to shafts 14, which shafts are rotatable in bearings 15 secured to said table, the latter being rigidly secured to frame 16 of the machine, which frame includes supporting legs 17.

The ends of shafts 14 opposite conveyor 3 are each provided with a spur gear 18 that mesh with the teeth of vertical racks 19. The racks 19 are supported for vertical reciprocable movement, and are connected by a cross bar 20 (Fig. 4) at their lower ends for simultaneous movement. Guide members 21 support the racks for vertical movement.

Centrally between the ends of cross bar 20 is secured the upper end of a vertical rod 22 that slidably extends through a guide and bearing 23 on the frame member 24 of the frame of the machine, for vertical reciprocation. The lower end of rod 22 connects by pivot 25 with one end of a link 26, and the opposite end of link 26 is connected by pivot 27, with the short arm 28 of a foot operated crank 30 that is pivoted to a frame member 29 by pivot 30'. The long arm of the foot crank is in the form of a foot treadle 30 adapted to be downwardly oscillated by pressure of the foot of an operator. This treadle is normally held at the upper end of its stroke by a coil spring 31 connecting between the treadle and frame of the machine.

In operation of the foot treadle, its downward stroke causes upward movement of rod 22, thus moving racks 19 upwardly and rotating gears 18 in a direction to cause the leaves to move simultaneously to vertical positions. Thus when the operator dumps a case of cans on table 1, and then presses the treadle 30 downward to the lower end of its stroke, any cans that may be misaligned relative to the conveyor 3, platform 5, and the spaces between fingers 9, will be moved to such proper alignment by said leaves. The leaves themselves are so mounted that they will be spaced when moved to vertical positions as to insure correct positioning of the tiers of cans on table 1. After removal of the pressure on treadle 30, the latter will move to the upper end of its stroke and the leaves 13 will again move to horizontal position ready for a new case of cans to be dumped on the table.

The pusher member 8 may comprise any suitable member for pushing the tiers of cans on table 1 to the conveyor 3 and platform 5. In the drawings this pusher is shown as vertically disposed strips 8 secured against the vertical leg of an angle bracket 32. The horizontal leg of said bracket slides on an extension 33 of the table 1, which extension is co-planar with the table and extends from the edge of the latter opposite the conveyor 3. This extension and table are formed with a central slot 34 (Fig. 3) for reciprocation of the block 35 depending from said bracket through said slot as well as for the connection between said bracket and a sliding guide plate 35' slidably engaging the underside of said table and its extension.

In Fig. 3, the pusher strips 8 are vertically disposed and arranged so each strip engages each superposed pair of cans at the ends of the rows of cans nearest said pusher, when the leaves 13 position the cans ahead of the pusher. For example, in the drawings, the machine is designed to handle a double tier of cans, each tier being twenty-four cans arranged in four rows of six cans each, thus four strips 8 are shown. This is a standard case of cans, although it is obvious that the machine can be made to handle the cans in various sized cases, in which the number of cans in the case varies, as well as the sizes of the cans.

At the rear end of the lower leg of bracket 32, the block 35 extends through slot 34. To said block is connected one end of a pair of links 36 by a pivot 37. The opposite ends of links 36 are pivotally connected to one end of an arm 38 by a pivot 39, and the opposite end of arm 38 is secured to a horizontal shaft 40 that is rotatable in bearings in side frame members 41 that connect between pairs of legs 17 of the machine.

A manually actuatable lever arm 42 is also secured to shaft 40, thus, upon rotating shaft 40 by actuation of arm 42, the pusher is moved against the cans positioned on the table 1, and pushes the cans toward and onto conveyor 3 and platform 5, said pusher moving between leaves 13, which leaves in upright position hold the cans in proper position during sliding of the latter on table 1 to said conveyor and platform.

The conveyor 3 comprises a plurality of relatively narrow, horizontally extending, parallel, endless belts 43. In the machine disclosed in the drawings (Fig. 3), there are four of these belts, so spaced that each is in alignment with a row of cans adapted to be supported on table 1. Each of the belts 43 is supported at one end, adjacent table 1, on a pulley 44 and at its opposite end remote from said table, on a pulley 45. A shaft 46 supports pulleys 44, and a shaft 47 supports pulleys 45, said shafts being rotatably supported at their ends in bearings in side frame members 16, in positions in which the said pulleys 44, 45 support the upper runs of the belts at a level slightly lower than the level of table 1.

As previously described, the ledge 11 between the conveyor and table 1, slopes downwardly from the level of the table to a level slightly below the upper runs of the belts at the ends of the latter adjacent said table. The edge of said ledge adjacent the pulleys 44 is inwardly recessed at spaced points at 48 to receive each of the pulleys in a recess. Thus, cans moved from table 1 toward the conveyor will successively slide downwardly on ledge 11 and onto the belts 43, where the said cans will be quickly carried by the belts over pulleys 45.

At the discharge end of conveyor 3, or adjacent pulleys 45, the cans may be delivered onto a bed of conventional conveyor rollers 49 (Fig. 1) for carrying to the labeling machine or other can handling station. The rollers 49 are positively rotated in a direction to rapidly carry the cans from the conveyor belts, by means of an endless belt 50 extending across one or both ends of the rollers. The lower side of the upper run of belt 50 engages the upper sides of the rollers, which belt is at one side of the path followed by the cans. End shaft 51 supporting one end of said belt may support a pulley 52 connected with a pulley 53 by a belt 54 driven by the source of power of the can labeling machine, or by a separate motor, if desired.

Between the shafts 46, 47, that support pulleys 44, 45 are idler rollers 55 that support the upper runs of belts 43 level when cans are carried on the latter. Shafts 56 support idlers 55, said shafts being mounted at their ends on frame members 16.

The platform comprises a horizontal row of horizontally disposed, spaced, strips 57 that extend longitudinally of belts 43. Adjacent straps are spaced apart the width of each belt 43, and are positioned so that the belts lie below these spaces. Thus the platform virtually comprises a platform formed with fully open, open-ended slots 60, which slots are over belts 43 and extend longitudinally of the upper runs of the latter (Figs. 3, 5).

Figure 5:
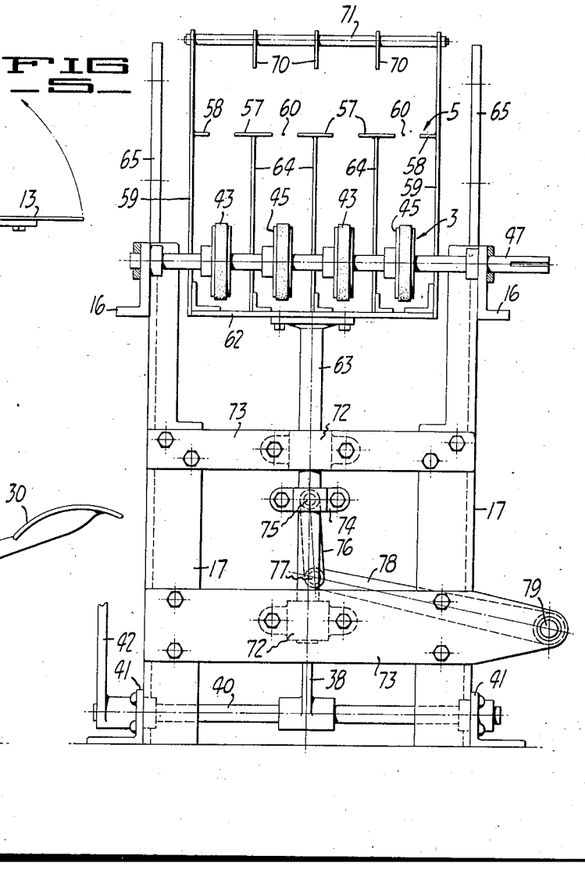
Fig. 5 is an end view of the apparatus as seen from the opposite end.

At opposite ends of the row of strips 57, are vertically disposed plates 59, each of which carries the end strip 58 of said row (Fig. 5). These plates 59 extend a substantial distance above the row of strips 58, and extend downwardly to below the pulleys 44, and to below the lower runs of belts 43. The plates are vertically slotted at 61 to pass the shafts 56, as best indicated in Fig. 2.

The lower edges of plates 59 are connected by a horizontal bottom plate 62 which plate is centrally supported on the upper end of a vertically reciprocable post or standard 63.

Each of the strips 57 between the end strips of the row thereof, is supported centrally of its width in a position planar with said end strips, by a partition plate 64, and each of said plates is formed with slots similar to slots 61 to pass shafts 56. The spacing between adjacent plates 64, and between walls 59 and the end plates 64 of the row of latter plates, is adapted to separate the cans of one row from the cans of the adjacent row, as said rows are moved longitudinally of each row onto the belts 43, and as they drop downwardly in passing over ledge 11, their upper ends will clear the ends of strips 57.

Figure 2:
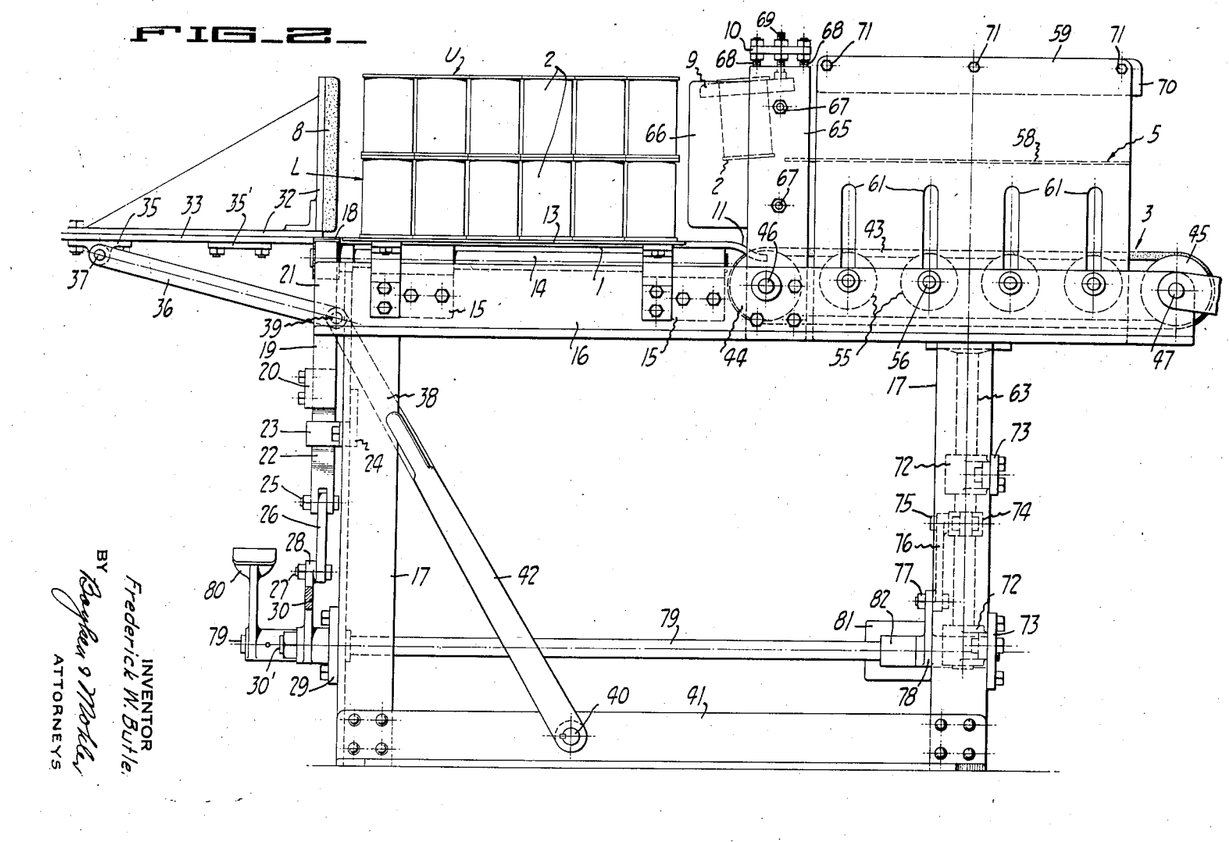
Fig. 2 is a side elevational view of my machine showing a double tier of cans thereon before actuation of the machine for arranging the tiers in one layer.
Figure 4:
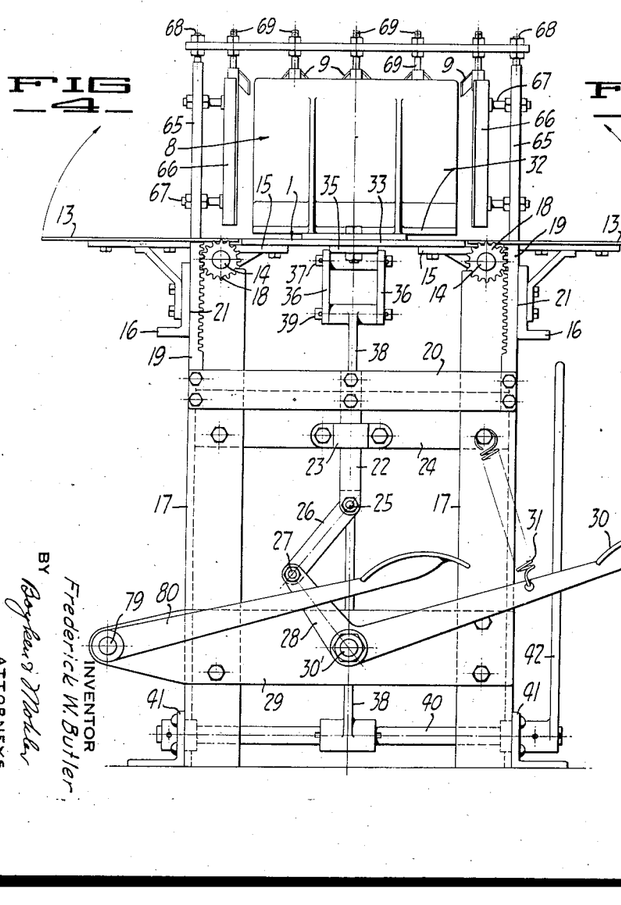
Fig. 4 is an end view of the apparatus from one end.

At opposite ends of shaft 46 are a pair of vertical frame members 65 that support the horizontally disposed frame member 10, and said frame members 65 each carry vertically disposed, opposed, guide plates 66 that extend between the adjacent edges of leaves 13 and the side plates 59, when the former are vertical (Figs. 2, 3). Guide plates 66 are adjustable horizontally on adjusting screws 67 carried by frame member 65, which screws may be locked in adjusted positions to said frame members by lock nuts, as indicated (Fig. 4).

The cross-frame member 10, carrying fingers 9, connects between the upper ends of side frame members 65, and this cross-frame member is vertically adjustable by vertical adjusting screws 68 by which they are secured to said members 65.

The spring fingers 9 are arranged in pairs each pair being carried at one of their ends at the lower end of a vertical adjusting screw 69 carried by frame member 10. These screws 69 extend downwardly from members 10, and are secured in adjusted positions by lock nuts, as seen in Fig. 2.

The members 10 of each pair are bowed longitudinally so that the concave sides of the fingers of each pair face toward each other, and their free ends opposite the ends secured to screw 69 meet at an acute angle (Fig. 3). The fingers project from their supporting screws in direction toward cans on table 1, and are slightly inclined downwardly toward said cans, are at a level just below the upper beads formed on the cans of the upper tier. As each pair of adjacent fingers 9 is in alignment with one of the partition plates 64, and as a pair of fingers is also in alignment with each end plate 59, it will be seen that the cans of the upper tier thereof on table 1 will be engaged by the adjacent fingers of adjacent pairs as the said cans are pushed toward the platform strips 57, and conveyor belts 43. These fingers will thus move the cans of the upper tier slightly upwardly, so their lower ends will clear the ends of strips 57, and will yieldably grip the opposite sides of each can. As the cans pass the ends of fingers 9 that are secured to screws 69, they will be released from the fingers and will pass onto the strips 57, with the cans of each row straddling the slots 60 in said platform.

The cans of said upper tier, after leaving fingers 9 are kept in alignment by means of vertically disposed, horizontally extending spacing strips 70 (Fig. 5) that are carried on cross bars 71, which bars are secured at their ends to the end plates 59 that carry the end strips 58 of the row of latter strips. Each strip 70 is coplanar with a partition plate 64 therebelow, but said strips 70 are spaced above said plates 64.

The positions of platform 5, and the other elements carried on bottom plate 62, has been described with respect to said plate 62 when the latter is at the uppermost end of the stroke of reciprocable post 63 that supports said bottom plate and said other elements.

This post 63 is vertically slidable in vertically spaced bearings 72 carried on spaced frame members 73 that are carried by a pair of the legs 17 of the main frame (Figs. 2, 5). Adjustably secured to post 63 between said bearings, is a bracket 74 carrying a pivot 75 to which one end of a link 76 is pivoted. The opposite end of link 76 is secured by a pivot 77 to one end of an arm 78, the opposite end of which arm is secured to a horizontal shaft 79 rotatable in bearings carried in extensions of frame members 29, 73 at one side of the machine. The shaft 79 extends outwardly of the end of the machine adjacent the foot treadle 30, and carries a foot lever 80 that extends across said end. This shaft also may carry a counterweight 81 carried on the outer end of an arm 82, which weight is arranged to counterbalance the weight of a load of cans on platform 5, including the weight of the platform and elements carried thereby.

In operation, the operator at the table 1, dumps the contents of a standard case of cans onto said table when the leaves of the latter are coplanar with the table. In dumping the said cans, the operator merely inverts the case so that the several tiers of cans in the latter will remain in superposed relationship with the cans upright and in several rows extending generally in alignment with the passageways over conveyor belts 43. The treadle 30 is then depressed, causing racks 19 to raise and to move leaves 13 to vertical, opposed relation, and to thus position the double tier of cans 2 on table 1 so they will properly enter said passageways over belts 43. The hand lever 42 is then actuated to cause the pusher device to push the double tier of cans bodily toward conveyor 3 and platform 5, onto which the cans of the lower and upper tiers will successively pass. As soon as the cans of the lower tier have passed from below the cans on platform 5, the operator pushes foot lever 80 downward, and the platform 5 is lowered. The cans on said platform will then simultaneously engage belts 43 and will be carried onto rollers 49 substantially as a unit, although the speed of travel of rollers 49 may be such as to carry the cans away from the belts 43 faster than they are carried by said belts, thus insuring against any possible pushing of the cans on rollers 49.

By the foregoing operations it is manifest that two tiers of cans in cases may be quickly delivered in a single layer in upright positions in such layer, to a can labeling or other can handling machine.

Figure 6:
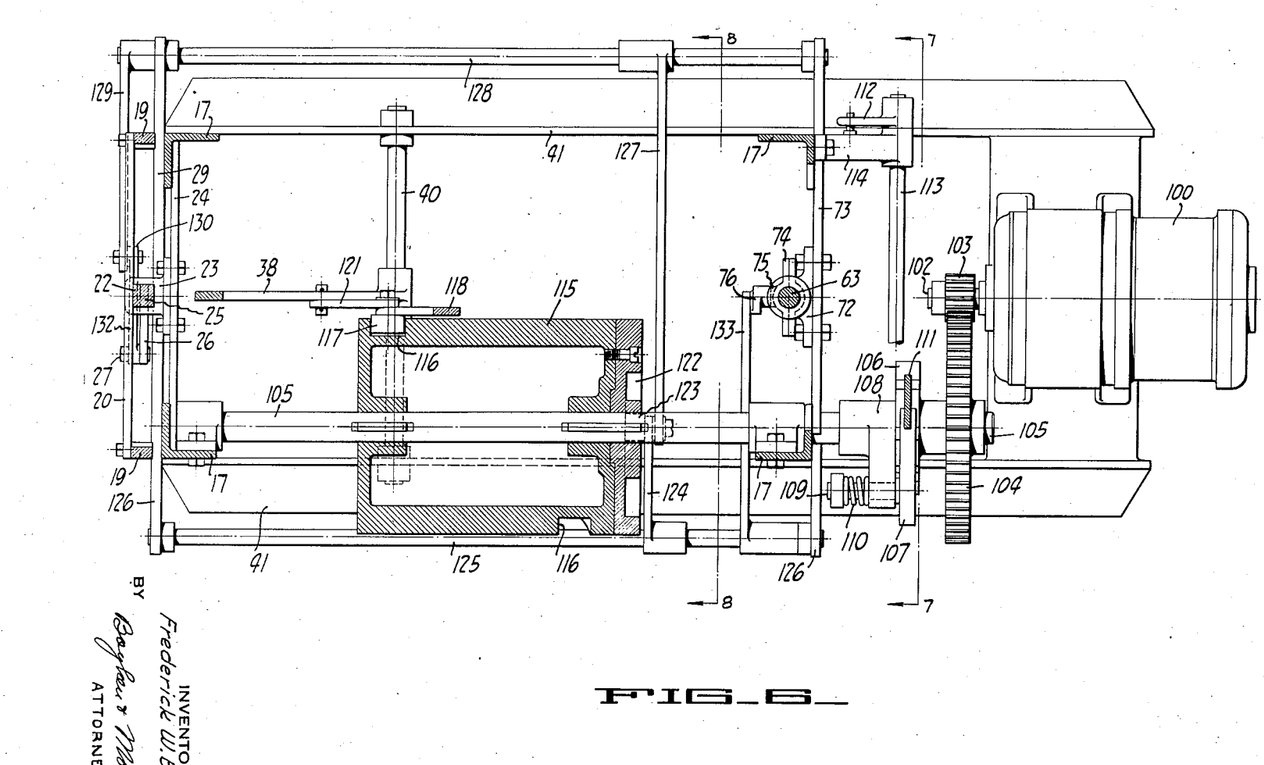
Fig. 6 is a part sectional, part elevational view of a modification including means for making the successive operations of the machine of Figs. 1 to 6 automatic.
Figure 7:
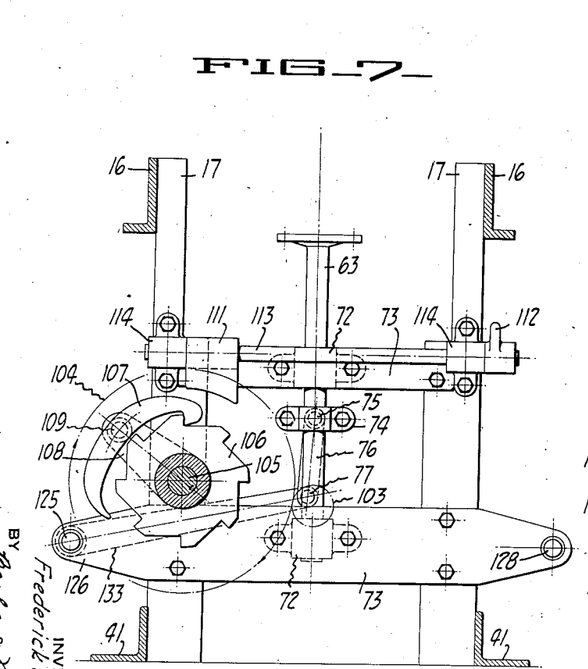
Fig. 7 is a sectional view taken along line 7—7 of Fig. 6.
Figure 8:
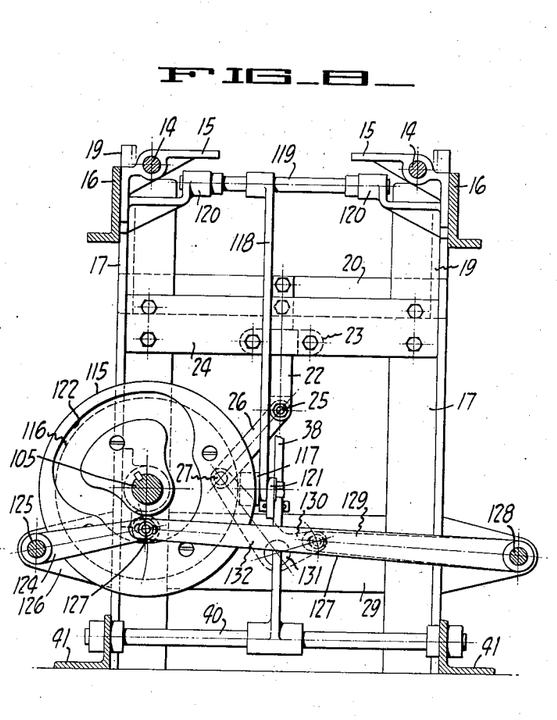
Fig. 8 is a sectional view taken along line 8—8 of Fig. 6.

In some instances, I provide automatic actuation of the leaves 13, pusher device, and platform 5, and one means for accomplishing these results is shown in Figs. 6 to 8 inclusive.

In Fig. 6 I show a motor 100 that drives a shaft 102 through a speed reducer, and on which shaft is a spur gear 103 in mesh with a spur gear 104 on a shaft 105. The hub of gear 104 is keyed to a ratchet 106, and a clutch dog 107 on the outer end of an arm 108 that is keyed at its opposite end to shaft 105, has a tooth adapted to engage one of the ratchet teeth for rotation of shaft 105 when the tooth of the dog and the ratchet are in engagement. This clutch dog is supported on arm 108 intermediate its ends, by pivot 109, and a torsion spring 110 maintains the tooth on the dog in engagement with the ratchet tooth unless the dog is pivoted by pressure on its end opposite its tooth, to release the dog from the ratchet. This release may be effected by a cam 111 adapted to swing to and from a position in the vertical plane of the dog, the cam surface of which cam when in a position in said plane, being adapted to engage the end of dog 107 opposite its tooth as the dog revolves about shaft 105, and to pivot the dog when such engagement is effected, to release the dog from driving engagement with the ratchet. Swinging of cam 111 is controlled by a manually actuatable handle 112 on shaft 113 that carriers said cam, said shaft being rotatably supported in bearings 114 on a pair of the legs 17 of the frame of the machine.

In operation, the dog 107 normally is in continuous engagement with the ratchet for continuously driving shaft 105.

On shaft 105 is keyed a cylindrical drum 115 in the outer cylindrical surface of which is an endless outwardly opening recess 116 extending around its cylindrical surface from one end to the other of the drum. The sides of this recess, axially of the drum, provide cam surfaces, and in said recess is a cam follower 117 in the form of a roller. This roller is carried at the lower end of an arm 118, said arm being fixed at its upper end on a shaft 119 that is rotatably supported in bearings 120 carried by the side frame members 16. A link 121 pivotally secured at one end to the shaft carrying roller 117 is pivoted at its other end to the arm 38 that actuates the pusher device 8.

Thus, upon each revolution of shaft 105, the arm 38 will actuate the pusher device for moving the cans from table 1 to the conveyor 3 and platform 5.

One of the axially facing ends of drum 115 is formed with an endless cam track 122 (Fig. 8) in which is a cam follower or roller 123. One end of an arm 124 carries the shaft mounting said roller, and the other end of said arm is secured to a shaft 125 that is rotatable at its ends in extensions 126 of the cross frame members 29, 73. Another arm 127 is pivotally and slidably secured to the shaft of roller 123, at one of its ends, and is secured to a second shaft 128 that is at the side of the machine opposite shaft 125, and which shaft is rotatably supported in extensions at the ends of frame members 29, 73 that are opposite extensions 126. The end of shaft 128 that is adjacent table 1 and leaves 13 carries an arm 129 that extends toward the shaft 125, but which terminates short of the center of the distance between legs 17 at said end.

The outer end of said arm terminating at said point, is pivotally connected with one end of one arm 130 of a bell crank that is pivoted at 131 to the frame of the machine. The other arm 132 of said bell crank is pivotally connected to one end of the link 26 that connects at its other end to the rod 22 that actuates the racks 19 for swinging leaves 13. The rotation of drum 115 thus causes the follower 123 to move up and down, with the result that the racks 19 are moved to swing the leaves 13 to vertical, opposed position, and the connections between the cam surfaces on drum 115 and the arrangement of said surfaces relative to each other is such that the pusher 8 is actuated after the leaves 13 are swung to opposed relation, and after withdrawal of the pusher for pushing the cans of a new batch, the leaves 13 will fall to horizontal position.

An arm 133 is also secured at one of its ends to shaft 125, and the opposite end of said arm is pivotally connected to one end of link 76 that is pivoted at its opposite end to the bracket 74 that is secured to post 63. This arm 133 corresponds to arm 78 as seen in Fig. 5. Thus, as shaft 125 is oscillated on its axis, the arm 133 will be actuated to raise and lower the platform 5, the arrangement of the linkage connecting between said post 63 and cam follower 123 being such that the platform will be lowered immediately after cans pushed onto the belts 43 are carried from below the platform 5, and will be maintained elevated during pushing of cans onto platform 5 and belts 43.

With the arrangement shown in Figs. 6 to 8, it is manifest that provision is made for making the machine wholly automatic, without modifying any of the main elements, and by merely establishing the described hook-up with the arm 78 that is connected with post 63, and with link 26 that is connected with racks 19, and with arm 38 that is connected with the pusher 8. In fact, the same machine may be quickly converted from a manually controlled machine to an automatic machine, or vice-versa, as desired.

The cans handled by the machine, where it is associated with a labeling machine, are generally filled and sealed, and ready for shipment, except for the labels. Heretofore the cans have been manually handled to re-arrange the plurality of tiers into a single tier for passage of the cans to the labeling machine, therefore, it is apparent that with my machine, an appreciably larger number of cans can be handled per hour than heretofore, with less labor.

Having described my invention, I claim:

1. Can transfer apparatus comprising; a substantially horizontal table; a conveyor extending from one end of said table, arranged and adapted to receive a tier of cans moved horizontally from said table onto said conveyor; means for so moving a tier of cans adapted to be positioned on said table; means actuating said conveyor for moving cans deposited thereon in direction away from said table; a generally horizontally disposed platform spaced above said conveyor arranged and adapted to receive an upper tier of cans that may be supported on a tier that is directly supported on said table when such latter tier is moved onto said conveyor carrying the upper tier therewith; means mounting said platform for downward movement; said platform being arranged and adapted to deposit cans thereon onto said conveyor when so lowered for carrying the cans so deposited away from said platform; and means for raising said platform to its original spaced relation after the cans so deposited on the conveyor therefrom have been carried away by said conveyor.

2. Can transfer apparatus comprising; a generally horizontally disposed table; a substantially horizontally disposed conveyor substantially adjoining one edge of said table and extending away from the latter; a substantially horizontally disposed vertically movable platform spaced above said conveyor; can positioning means arranged and adapted to position a double tier of cans on said table in a position for movement of the upper and lower of such tiers of cans onto said platform and conveyor respectively when both tiers are moved horizontally toward said platform and said conveyor; means for so moving said tiers; means for actuating said conveyor for carrying cans moved thereon in direction away from said table and from below said platform; the upper can supporting surface of said conveyor being at a level slightly below that of the can supporting surface of the table whereby the lower tier of cans moved from said table onto said conveyor will drop away from said platform, and said platform being spaced above said surface of said conveyor a slightly greater distance than the height of the cans adapted to be moved onto said conveyor.

3. Can transfer apparatus comprising; a generally horizontally disposed table adapted to support a double tier of cans thereon; a pusher member arranged and adapted to push such double tier horizontally in a predetermined position and along a predetermined path, over one edge of said table; a horizontally extending movable conveyor means adjacent said edge arranged and adapted to carry away the lower of such tiers when a double tier of cans so positioned on said table is pushed over said edge by said pusher member; means for positioning such double tier on said table in said predetermined position; a platform stationary against horizontal movement positioned over said conveyor to receive the upper of such double tier when said double tier is pushed over said edge; means for lowering the platform to deposit the upper tier of cans supported on said platform onto said conveyor for carrying by said conveyor; means for continuously moving said conveyor to carry cans to be deposited thereon in direction away from said table.

4. A construction as defined in claim 3, said conveyor comprising a plurality of horizontally extending endless belts in spaced, side by side, parallel relation with said belts arranged to provide an upper elongated run on each belt adapted to support a can thereon; and said platform being formed with slots positioned to receive each of said upper runs thereon when said platform is lowered, whereby cans on said platform extending across said slots will be engaged by said belts when the platform is so lowered.

5. Can transfer apparatus, as defined in claim 3, means automatically actuating said pusher member and said means for lowering said platform in succession, and in a manner whereby said platform will be lowered only after cans on said conveyor are fully removed by the latter from below said platform.

6. Can transfer apparatus, as defined in claim 3, means automatically actuating the said means for positioning cans on said table, and said pusher member in succession and in a manner whereby said pusher member will move said double tier from said table only after the said double tier is positioned by said positioning means.

7. Can transfer means as defined in claim 3, means automatically actuating the said means for positioning cans on said table, and said pusher means, and said means for lowering said platform in succession.

8. Can transfer apparatus comprising conveyor means for supporting a pair of tiers of upright cans disposed one directly over the other for movement along a generally horizontally extending path of travel; can supporting means at a point along said path arranged and adapted to engage and to support the cans of the upper of said tiers free from the cans of said lower tier and to deposit the cans of said upper tier as a unit on said conveyor means, said can supporting means including a generally vertically movable device spaced above said conveyor means and provided with elements positioned to support the lower ends of the cans of said upper tier thereon; means for causing generally reciprocable movement of said device; and means associated with said device for guiding the upper of a pair of superposed tiers of upright cans onto said device when such pair of tiers is moved generally horizontally in said path.

9. In apparatus of the character described; a substantially horizontally extending conveyor adapted to support a tier of upright cans thereon for movement horizontally therewith upon actuation thereof; conveyor actuating means for so actuating said conveyor; a vertically reciprocable horizontal platform over said conveyor adapted to support a tier of upright cans thereon for downward movement therewith; said conveyor comprising a plurality of adjacent pairs of spaced, parallel endless belts in side by side relationship; said platform comprising a plurality of adjacent pairs of spaced, parallel strips in side by side relationship with each pair of adjacent strips being adapted to support one of the cans of such tier thereon in a position extending across the space therebetween; and means supporting said strips substantially parallel with the said belts and for simultaneous downward movement thereof into the spaces between the said endless belts whereby cans on said strips and extending across the spaces therebetween will be deposited on said belts for movement therewith.

10. In apparatus of the character described; a plurality of adjacent pairs of horizontally disposed, endless conveyors arranged in side by side co-planar relation and each conveyor being adapted to support a row of upright cans thereon extending longitudinally thereof for movement longitudinally of the conveyors upon actuation of the latter; means for so actuating said conveyors simultaneously in one general direction; a plurality of horizontally extending, spaced, parallel, co-planar strips arranged in side by side relation; means supporting said strips directly over the spaces between said conveyors and longitudinally of the latter for downward movement of said strips into said spaces and below the upper surfaces of said conveyors; adjacent pairs of said strips being respectively adapted to support a row of upright cans thereon extending longitudinally thereof with the cans of each such row extending across the space between the pair of strips supporting the same; a table-like support adjacent one of the corresponding ends of said conveyors and strips for supporting a pair of tiers of upright cans in superposed relation thereon with the cans of each tier in rows extending generally parallel with said strips and said conveyors; can supporting and guiding elements extending between said support and said corresponding ends of said conveyors and strips for supporting and guiding cans of the upper and lower tiers of such pair onto said strips and conveyors respectively upon moving such pair of tiers as a unit horizontally from said support toward and past said elements.

11. Can handling apparatus of the character described comprising; a horizontal loading table adapted to support thereon vertically disposed cans arranged in a plurality of rows in a pair of tiers positioned one on the other; a horizontally disposed conveyer adjoining said table having a substantially horizontal load supporting surface substantially level with the can supporting upper surface of said table; a substantially horizontal platform spaced above said conveyer adapted to support thereon the upper of such pair of tiers thereof; an extension adjoining said conveyer at the end of the latter remote from said table; means for actuating said conveyor for carrying cans from said table to said extension; can aligning means disposed alongside said table movable into engagement with cans of such tiers for aligning the cans of said tiers in rows extending parallel with the direction of movement of said conveyor; means for simultaneously moving the aligned rows of cans adapted to be supported on said table longitudinally of said rows onto the said platform and said conveyer; and means for simultaneously lowering the cans so moved onto said platform to said conveyer after the cans on said conveyer have been carried by the latter from below said platform to said extension.

12. The method of handling case lots of cans between a loading station and a labeling station, or the like, in which each lot consists of a pair of tiers of upright cans, one disposed on the other, at said loading station, with the cans of each tier arranged in a plurality of parallel, horizontally extending rows; supporting each case lot of cans for movement as a unit horizontally in generally one direction from said loading station along a path of travel parallel with said rows and so moving said cans; then during said movement in said one direction separating the cans of the upper tier from the cans of the lower tier and supporting the cans of the upper tier for movement independently of the cans of the lower tier; and then accelerating the movement of the cans of said lower tier in said one direction while continuing said movement of the cans of said upper tier in said direction at a slower rate of speed than the accelerated speed of the cans of the lower tier whereby the cans of said lower tier will be moved from below the cans of the upper tier during said movement of the cans of the upper tier in said direction; then lowering substantially all of the cans of the upper tier simultaneously to substantially the level of the cans of said lower tier and behind said latter tier and then continuing the movement of the cans so lowered in said one direction following the cans of said lower tier.

FREDERICK W. BUTLER.